United States Patent [19]

Otake et al.

[11] Patent Number: 4,805,039

[45] Date of Patent: Feb. 14, 1989

[54] INDEX SHEET, METHOD FOR MAKING SAME, PACKAGE OF SAME WITH IMAGE RECORDING MEDIUM, AND CONTAINER FOR SAME TOGETHER WITH IMAGE RECORDING MEDIUM

[75] Inventors: Katsumi Otake; Nobuyuki Iwakami, both of Tokyo, Japan

[73] Assignee: Fuji Photo Film Co., Ltd., Kanagawa, Japan

[21] Appl. No.: 799,597

[22] Filed: Nov. 19, 1985

[30] Foreign Application Priority Data

Nov. 19, 1984 [JP] Japan ............................. 59-244124
Jul. 16, 1985 [JP] Japan ........................ 60-107556[U]

[51] Int. Cl.⁴ ............................................. H04N 5/76
[52] U.S. Cl. .................................. 358/335; 360/137; 206/383
[58] Field of Search ................ 358/335, 342; 360/55, 360/137, 92, 93; 206/387, 444, 472, 312; 40/312

[56] References Cited

U.S. PATENT DOCUMENTS 4,285,150  8/1981  Richardson ........................... 40/312
4,519,500  5/1985  Perchak ............................. 206/312

FOREIGN PATENT DOCUMENTS

52-104919  8/1977  Japan .
59-98899   6/1984  Japan .

Primary Examiner—Robert L. Richardson
Attorney, Agent, or Firm—Young & Thompson

[57] ABSTRACT

An index sheet formed of one recording sheet on which are printed, as small-size positive images in parallel rows, a plurality of scenes recorded on an image recording medium such as, for example, a photographic film, a still video floppy, a video cassette, or a video disc. The small positive images are arranged in the same order they were taken, and frame numbers are printed in juxtaposition with the respective positive images. To produce such an index sheet, a plurality of strips of negatives are copied onto photographic paper in a reduced size with the negative strips inserted in a negative sheath. For a magnetic or optical image recording medium for a very large number of images, a lesser plurality of scenes read out are edited in such a manner as to arrange them in a representative sample and thereafter are printed on a recording sheet. This index sheet can be part of a package comprising a container having a casing formed with at least one recess for the image recording medium and/or printed photographs, and a cover swingably mounted on the casing. A transparent pocket formed on the outer or inner side of the cover contains the index sheet.

13 Claims, 11 Drawing Sheets

INDEX SHEET, METHOD FOR MAKING SAME, PACKAGE OF SAME WITH IMAGE RECORDING MEDIUM, AND CONTAINER FOR SAME TOGETHER WITH IMAGE RECORDING MEDIUM

BACKGROUND OF THE INVENTION

This invention relates to an index sheet which is printed with a plurality of scenes of small size arranged in at least one row so that an outline of the contents recorded on an image recording medium can be obtained at a glance, a method for making the same, a package comprising the same with an image recording medium, and a container for the same.

There are two types of image recording medium: one is a photographic film which records an image or scene as it is, and the other is represented by a small video floppy, video cassette, video disc, etc. which records an image after first converting it into an electric signal or an optical signal. Generally, photographic film is widely used since this means of image recording and the viewing thereof are simple and convenient. Recently, as video cameras have become widespread and commonly used, video cassettes are also being widely used. Furthermore, there has recently been introduced on the market so-called TV photo system service which records an image once recorded in a printed photograph, on a still video floppy, which for this purpose is also being widely used.

When using an image recording medium such as a still video floppy, a video cassette, a video disc, etc. which records an image by converting it into a signal, if it is desired to see an image or scene recorded thereon, an image regenerating apparatus is used to read out a signal recorded on the image recording medium and show it on a display such as a CRT, etc. Since it is impossible to tell by sight what scenes are recorded on the image recording medium, it is a long and laborious process to find the recording medium on which a desired scene is recorded.

In the case of photographic film, although a scene recorded thereon can be directly seen, since the recorded scene is a negative image, it is rather difficult to tell the difference between the various scenes without very careful observation. In the case of the aforementioned still video floppy, etc., a displayer is utilized for viewing. On the other hand, in the case of photographic film, since a photograph printed therefrom is utilized, it is difficult to determine easily which scenes are recorded thereon when these are stored in an overlapped state.

Generally, a processing laboratory gives the customer a processed photographic negative film and a photograph enlarged and printed therefrom enclosed in an envelope. This photographic negative film is usually cut into several parts each containing several negatives, and inserted in a negative sheath with one or both ends thereof open. Many users keep printed photographs by putting them in an envelope without properly arranging them in an album. When the printed photographs are kept in an envelope in this way, or otherwise kept in an individual container, it is very difficult to tell which prints are in the envelope or other container. Although there is available a roll of developed photographic negative film or a contact print of the negatives, these are all in a horizontally elongated band and are large in size. Accordingly, there is the disadvantage that the contents cannot be seen at a glance and the keeping thereof is inconvenient.

OBJECTS OF THE INVENTION

It is therefore a primary object of the present invention to provide an index sheet and a method for making the same, from which it can be easily determined what scene is recorded on an image recording medium.

It is another object of the present invention to provide an index sheet and a method for making the same, from which can easily be found the image recording medium on which a desired scene is recorded.

It is a further object of the present invention to provide an index sheet and a method for making the same, wherein all or a major part of a plurality of scenes recorded on an image recording medium are arranged in the order of the recording thereof.

It is a still further object of the present invention to provide an index sheet and a method for making the same, wherein frame numbers are juxtaposed with printed scenes.

It is a still further object of the present invention to provide an index sheet and a method for making the same, wherein an index sheet can be easily made from a photographic film.

It is a yet further object of the present invention to provide an index sheet and method for making the same, employing a container for an index sheet together with an associated image recording medium.

Another object of the present invention is the provision of a package comprising a container for an image recording medium, the container carrying such an index sheet pertaining to what is recorded on the medium.

It is an additional object of the present invention to provide a container having a transparent pocket in which an index sheet can be inserted to serve as a front cover.

SUMMARY OF THE INVENTION

In order to achieve the above objects, there is provided by the present invention an index sheet on which all or a substantial number of scenes of a plurality of scenes recorded on an image recording medium are arranged in at least one row and printed as small-size positive images.

In a preferred embodiment of an index sheet according to the present invention, a plurality of scenes are arranged in one row and in the order of the recording thereof, and frame numbers are printed in position near to the respective scenes.

If the image recording medium is a photographic film, a roll of negative film is printed on a sheet of photographic paper in a reduced size, keeping the same arrangement when the plurality of negatives are inserted in a negative sheath, and at the same time, frame numbers are applied in such a manner as to correspond to the respective positive images. This is effected by applying to the strip of negatives a shading mask having a horizontally elongated opening corresponding to the negatives, and printing therefrom a strip of positive prints of reduced size.

If the image recording medium is a video floppy, a video cassette, a video disc, etc., in order to record a scene recorded thereon by a positive image, a video printer well known per se, for example, a photographic printer, an electrophotographic printer, a thermal printer, an injection printer, etc. is used, and the scenes are recorded in a row in reduced size in the same order in which they are recorded on the image recording medium. Among these video printers, the photographic printer produces the best image quality. Accordingly, it is preferred that a photographic printer be used to print the positive image shown on a CRT, on a photographic paper in a reduced size.

If a still video floppy is used as an image recording medium, since the recordable pieces thereof are 48 in number, all the scenes can be printed on one recording sheet in small size. In this case, if frame numbers are juxtaposed with the positive images, a desired scene can be directly reproduced. If a video cassette or video disc is used, since the recorded scenes are many, the printing is effected for groups of a certain number of scenes, or otherwise a characteristic scene is selected for printing. Generally, since similar scenes are contained in a sequential manner, similar scenes are grouped and at least one representative scene may be picked from each of several groups for printing. If the scenes thus picked are many, the printing may be effected on separate recording sheets.

If a photographic film is to be printed, or printed photographs are to be recorded on a still video floppy, etc., the customer submits the photographic film or printed photographs to a processing laboratory. When the processing laboratory returns to the customer the printed photographs together with the photographic film, or a recorded video floppy, etc,, it is preferable to return these materials to the customer in a book-shaped container. The book-shaped container is provided on its cover with a transparent pocket for an index sheet. If the pocket is formed on the front of the cover, the index sheet can be used as a cover sheet.

In the present invention, since all or some of a plurality of scenes recorded on an image recording medium are printed as positive images of small size on one recording sheet, the recorded contents which cannot be seen can be easily determined by viewing these small positive images. Also, in the case of a photographic film, respective frames recorded on one roll of negative film are printed in a reduced size while keeping the same arrangement when the negatives are inserted in the sheath. Accordingly, it is very easy to tell what photographs are on any one roll of negative film or what photographs are in the container of printed photographs. Furthermore, it is especially convenient that the frame numbers are also printed, when additional printing is required or printed photographs are to be properly arranged.

DETAILED DESCRIPTION OF THE INVENTION

Figure 1:
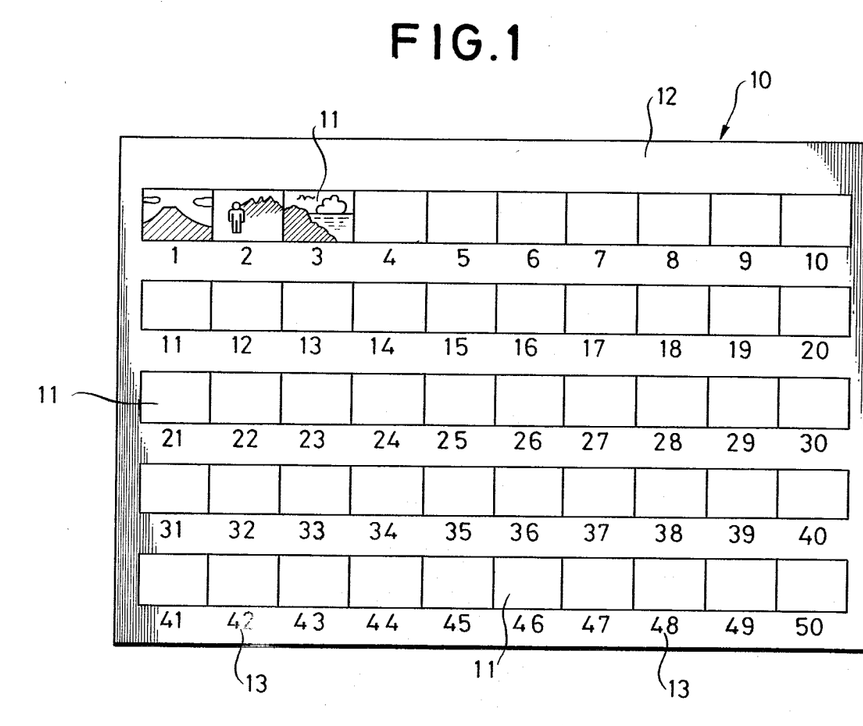
FIG. 1 is a plan view showing one embodiment of an index sheet.

FIG. 1 shows one example of an index sheet of the present invention. An index sheet 10 is formed of a record sheet 12 printed with all or part of the scenes recorded on an image recording medium as small-size positive images 11 in color. In this embodiment, five rows each including ten scenes, i.e., 50 scenes of positive images 11, are arranged groupwise, preferably in plural straight parallel rows. These positive images 11 in each row are arranged in the same order as when they were recorded on the image recording medium, and frame numbers 13 are juxtaposed thereto. What kind of record sheet 12 is to be used is determined by what printing method of the positive images 11 is employed. For example, when a photographic printing method is employed, a color photographic paper is used. When a color electrophotograph printing method is employed, a common paper is used.

When a still video floppy is used as an image recording medium, all the scenes can be printed thereon, since the recordable scenes are 48 in number. However, when a video cassette or video disc is used as the image recording medium, it is impossible to print all the scenes since they are too many. Therefore, sufficient scenes for obtaining a general idea of the recorded contents are selectively printed. In this case, the frame numbers 13 denote the order of the scenes printed.

The size of the index sheet 10 is determined by how it is used. In the present embodiment, the sheet 10 is 127 mm high, 178 mm wide, and 0.23 mm thick. The size of the positive image 11 is 12 mm high and 16 mm wide in this embodiment, which makes it possible to see what scenes are there.

The image recording medium is adapted to outline the contents recorded on the image recording medium, and to be used as a table of contents or for finding a particular scene it is desired to see. This index sheet 10 can be attached to a casing of the image recording medium or a container for the image recording medium, or can be otherwise included in the container together with the image recording medium.

Figure 2:
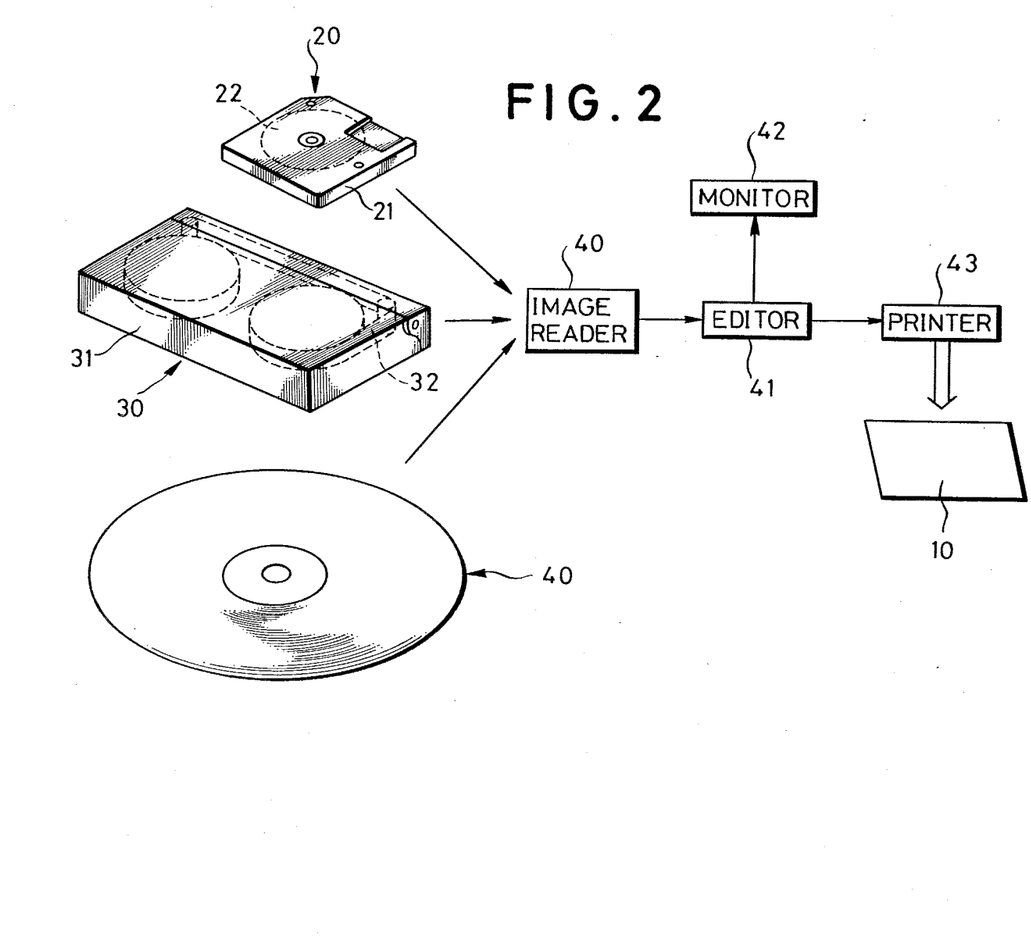
FIG. 2 is a schematic view showing one example of an index sheet making apparatus.

FIG. 2 illustrates an index-sheet-making apparatus. Used as the image recording medium are, for example, a still video floppy 20, a video cassette 30, a video disc 40, etc. Rotatably included within a pack 21 of the still video floppy 20 is a magnetic sheet 22, and up to 24 scenes are recordable when recorded framewise. In a field recording mode, 48 scenes are recordable. Included in a cartridge 31 of the video cassette 30 is a magnetic tape 32, and a number of scenes are recorded thereon in the form of magnetic signals. The video disc 40 is a disc made of polyvinyl chloride. The video disc 40 is an electric capacity means or an optical means according to its reading-out means.

The recording medium is loaded in an image reader 40. The recorded signals are read out by the reader 40 and fed to an editor 41. The editor 41 picks up the desired scenes from among all the scenes, arranges them in the order of recording, and assigns a number to each of them. The scenes thus arranged can be confirmed by a monitor 42 The edited plurality of scenes are fed to a printer 43 and printed on the recording sheet 12. In this way, the index sheet 10 is made.

The index-sheet-making apparatus is designed such that the edited plurality of scenes are printed on the recording sheet at one time. Alternatively, it may be designed such that the image reader 40 reads out one scene at a time and feeds it to the printer 43, in which the scene is printed in a reduced size, and thereafter the recording sheet is moved to print the next scene.

Figure 3:
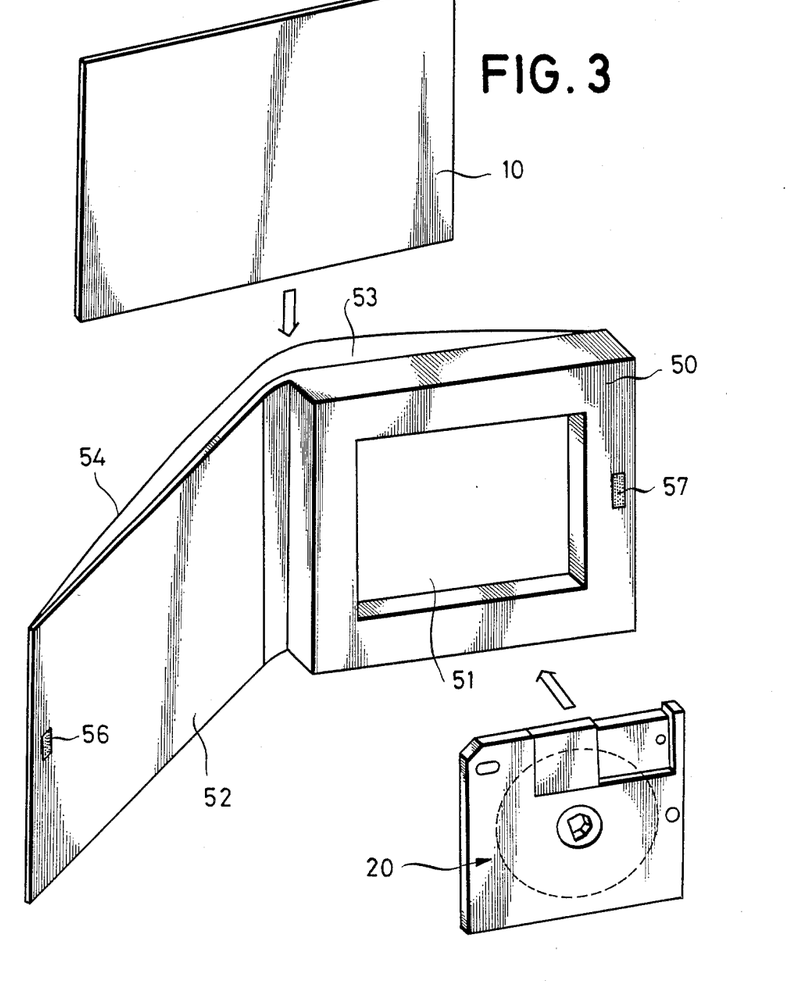
FIG. 3 is an exploded perspective view showing a container for an index sheet together with a still video floppy.
Figure 4:
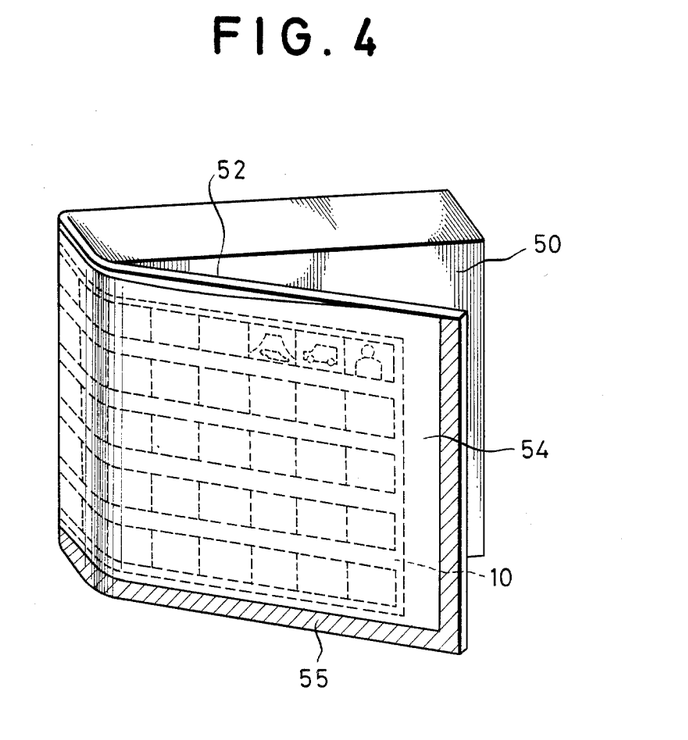
FIG. 4 is a perspective view of the container shown in FIG. 3 with its cover slightly opened.

FIGS. 3 and 4 illustrate one example of an index sheet which is used as a cover sheet of a container for a still video floppy. A casing main body 50 formed in a book shape is provided at its central portion with a recess 51, in which the still video floppy 20 is received. The casing 50 has a cover 52 that can be opened and closed. The cover 52 and the casing 50 are provided on the front sides thereof with a transparent pocket 53, in which an index sheet 10 is inserted with the positive image 11 disposed on the front or outer side thereof. This transparent pocket 53 can be made by attaching, for example, the three sides 55 of a transparent sheet 54 to the casing 50 and the cover 52. Reference numerals 56 and 57 denote pressure-sensitive fasteners.

The still video floppy container can be used for a television-photo system so that printed color photographs or photographic color negative films can be watched on a home television set. The television-photo system is adapted to convert a photograph supplied by a customer, to an electric signal by laboratory equipment, and to record the same on the still video floppy 20. This service is rendered by the processing laboratory. At this time, the recorded still video floppy 20 is put in the casing main body 50 with the index sheet 10 inserted in its pocket 53 and given back to the customer in this condition.

When the index sheet 10 is used as a cover sheet, it can be easily recognized at a glance what scenes are recorded on the still video floppy 20. Accordingly, it is no longer necessary to use an image reproducing apparatus to find a desired scene by inspecting the recorded scenes one by one.

In the above-mentioned embodiment, only one recess 51 is provided. In addition, however, another large recess may be provided in order to include printed photographs therein. In this way, the large recess can be used just like an album. Furthermore, it is possible to put photographic negatives in the transparent pocket 53 together with others, or to form a negative-film-containing portion on the casing 50. The cover 52 may have attached to its inner side a transparent sheet (not shown) to form a pocket.

The container shown in FIG. 3 can also be used when the video cassette 30 is used as a recording medium. In this case, since the video cassette 30 is large in size compared with the still video floppy 20, the size of the container should be correspondingly large.

Figure 5:
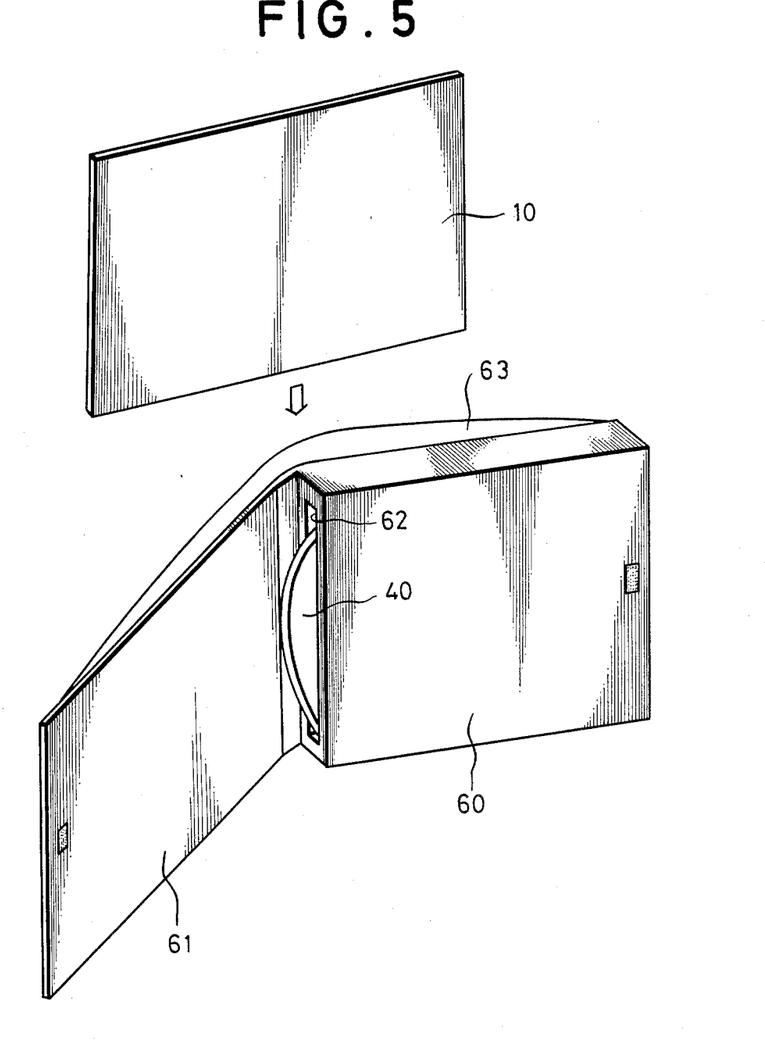
FIG. 5 is an exploded perspective view of a container including an index sheet together with a video disc.

FIG. 5 illustrates an index sheet applied to a cover sheet of a video disc container. The casing 60 is provided with a containing portion 62 formed on the same side as cover 61 with an inserting opening. Inserted in the containing portion 62 is a video disc 40. To the casing 60 and the cover 61 is attached a transparent sheet to form a pocket 63, in which the index sheet is inserted.

Figure 6:
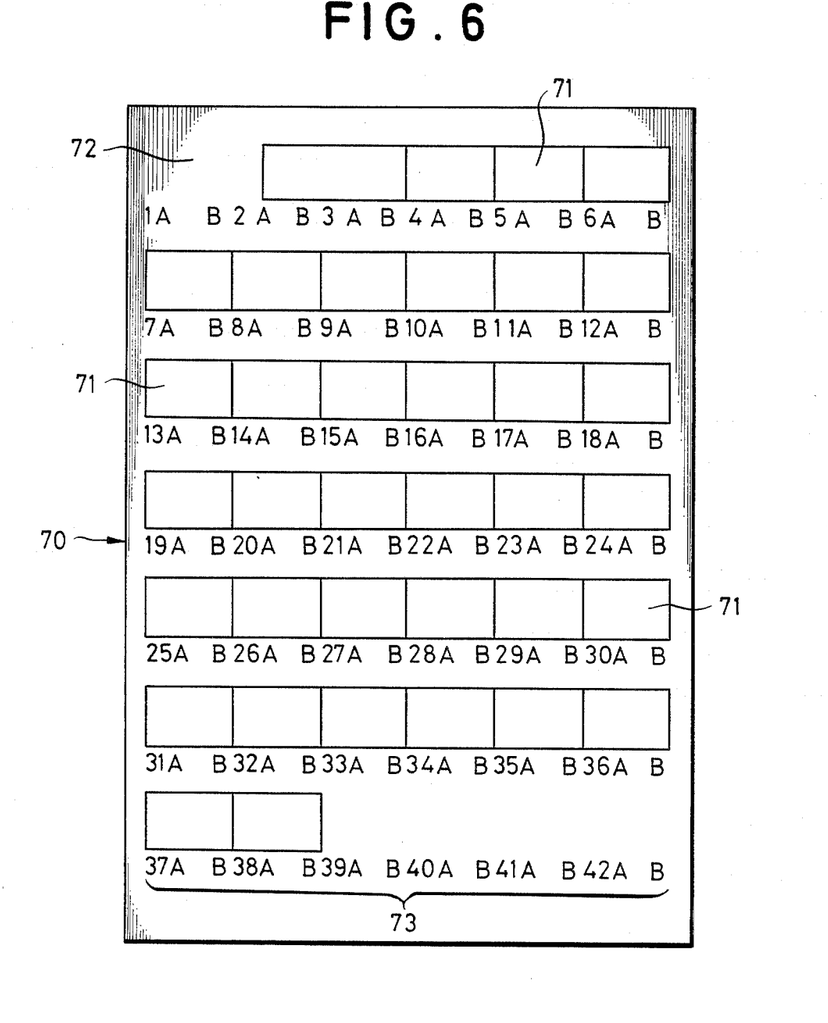
FIG. 6 is a plan view showing an index sheet for a photographic film.

FIG. 6 illustrates an index sheet for photographic films. An index sheet 70 serving as a photograph index is printed as a positive image 71 in a reduced size with respective frames recorded on one roll of photographic negative film (hereinafter referred to simply as "negative film") on photographic paper, for example, a sheet of color photographic paper 72. These respective positive images 71 are printed while keeping the same arrangement of the negatives in the negative sheath. That is, since one negative normally includes six frames, a negative film for 36 photographs is printed in seven rows. Each of the positive images 71 is recorded thereunder with a frame number 73, which can be used as a reference number for proper arrangement or for designating a desired frame when an order is placed for additional printing. The size of the index sheet depends on the way it is to be kept. In this embodiment, photographic paper 178×127 mm in size is used, and is printed with a reduction ratio of $\frac{1}{5}$. Although only the image on the inner side of perforations need be printed, the whole negative film including the perforation can be printed if desired. In this case, the frame numbers recorded on the negative film are also printed. Accordingly, they can be used for the frame numbers 73.

Figure 7:
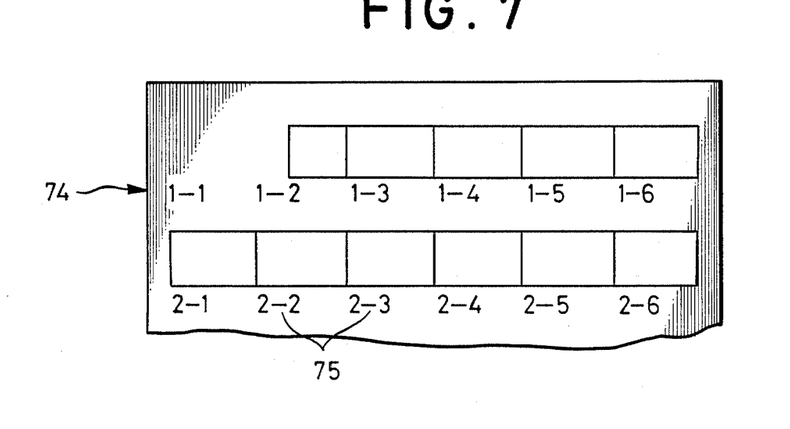
FIG. 7 is a fragmentary plan view of one embodiment of an index sheet having different forms of frame numbers.

FIG. 7 illustrates another embodiment of frame numbers. The frame numbers 73 printed on an index sheet 74 are codes comprised by combinations of numerals representing rows and numbers within each row. The frame numbers are shown as, for example, 1-1 and 1-2.

As for the method for printing the index sheet, there are various such methods. For example, prior to the film cutting process in a laboratory, a six-frame portion is positioned in the exposing position, and the same is printed on a photographic paper to form one row. Thereafter, the photographic paper is moved by one row, and at the same time, the next six frames are fed to the exposing position for printing the next row. By repeating the foregoing, an index sheet is made. Instead of moving the photographic paper, the negative film may be moved by one row. Otherwise, negatives which are cut for every six frames in a film cutting process are used, and these are arranged side by side to print simultaneously to make the index sheet.

The most rational and simplest method for printing is to effect printing with the negatives inserted in the negative sheath. According to the existing laboratory system, an automatic loading process for negatives is provided after the film cutting process. The negatives are loaded in the negative sheath after printing, and the same is given to the customer in that condition. Thus, it is possible to make an index sheet easily by using the presently existing laboratory system as is.

Figure 8:
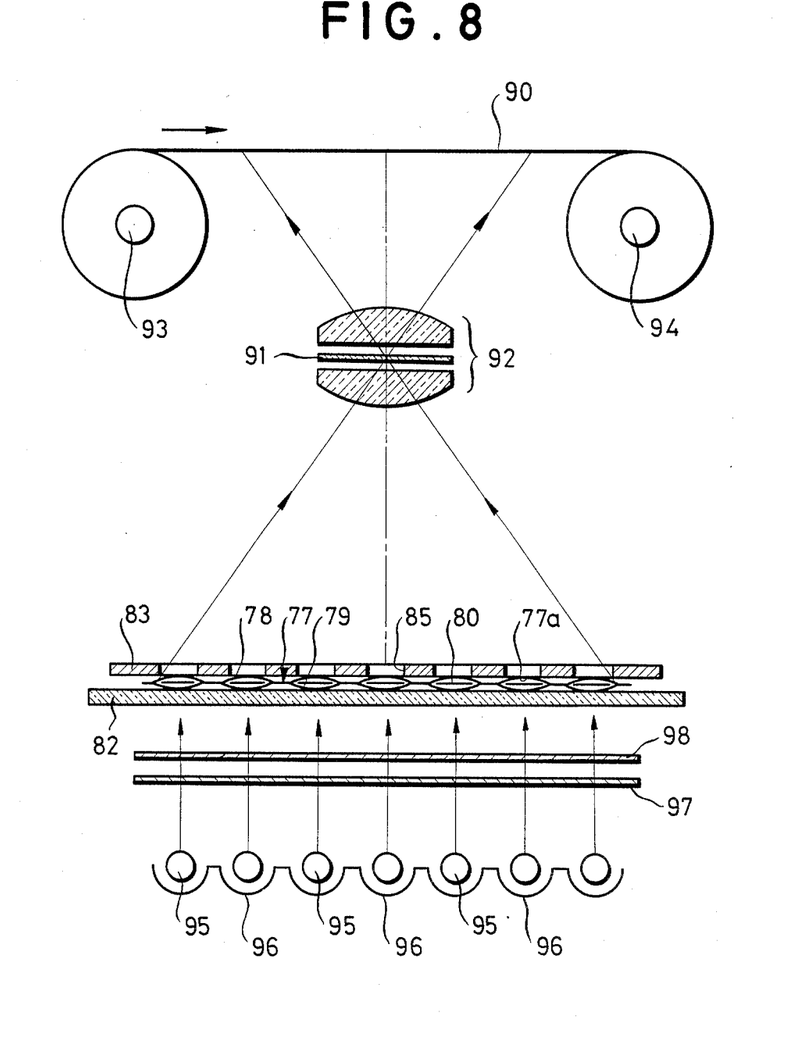
FIG. 8 is a schematic view showing a method for making the index sheet shown in FIG. 6.

FIG. 8 illustrates the printing of an index sheet. As is well known, a negative sheath 77 is formed in such a manner that two transparent or semi-transparent plastic sheets 78 and 79 are placed one upon the other, and the sheets 78 and 79 hot-sealed in a band at regular intervals greater than the width of a negative 80. Due to the hot-sealing, a plurality of tunnels 77a, seven tunnels for example, are formed. The negatives 80 are inserted in the tunnels 77a. Although the tunnel 77a is slightly wider than the negative 80, since the latter is inserted by an automatic loading machine, it is correctly positioned in a predetermined position within the tunnel 77a. When a translucent negative sheath 77 is used, it functions as a diffuser.

Figure 9:
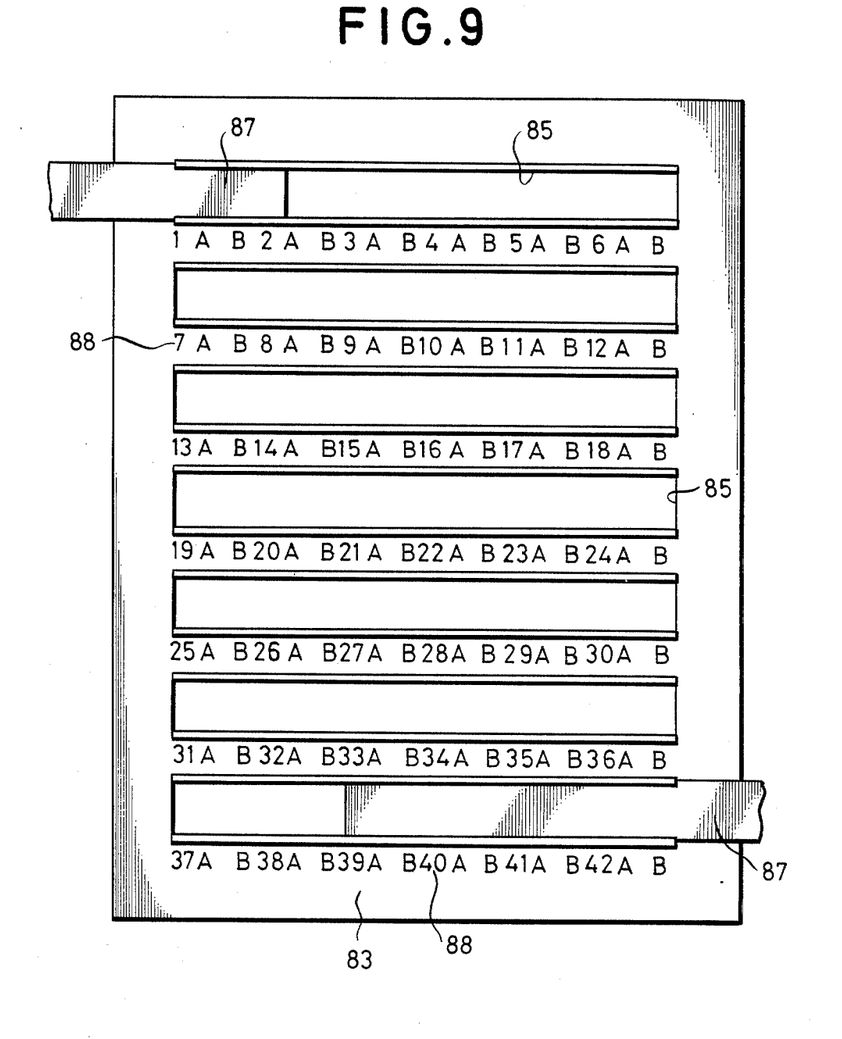
FIG. 9 is a plan view showing a specific example of the shading mask shown in FIG. 8.
Figure 10:
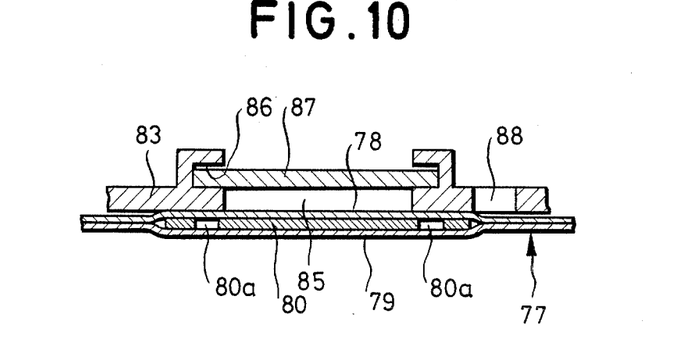
FIG. 10 is a sectional view showing in more detail the construction of the shading mask shown in FIG. 9.

The negative sheath 77 is placed on a transparent or translucent stage 82, and an opaque shading mask 83 is placed thereon. This shading mask 83 is adapted to maintain the flatness of the negatives 80 by pressing toward the stage 82 with the negatives 80 in the negative sheath 77, to mask unneeded portions, to prevent the index sheet from becoming yellow due to halation, and the like. As is shown in greater detail in FIGS. 9 and 10, the shading mask 83 is formed with an opening 85 at a location corresponding to each negative 80. The height of these openings 85 is about equal to the size of an image plane (24 mm), so that the perforations 80a will not be printed.

The index sheet should be printed with only the effective frames. The number of these may vary somewhat depending on the user, and when a negative film is loaded on a camera, depending also on the length of its portion fixed to the take-up spool. Accordingly, the position of the first effective frame can be different depending on the particular negative. Furthermore, the position of the final effective frame can be different depending on the number of negatives and how many photographs are taken. In view of the foregoing, the shading mask is formed with a groove 86 (FIG. 10) extending along the opening 85. Slidably engaged in the groove 86 is a shading plate 87. By suitably sliding the shading plate 87, an unneeded portion of the opening 85 can be shaded.

The shading mask 83 is provided with numerals 88 corresponding to the frame numbers in position near the respective openings 85. Instead of the numerals 88, a character display plate formed of liquid crystal, etc. may be lodged in holes formed in the shading mask 83. When a character display plate formed of a number of light emitting diodes two-dimensionally arranged is used, the same is mounted in a plane opposite to a color photographic paper 90 (FIG. 8).

Disposed at an upper location of the mask 83 is a reducing lens system 92 having a shutter 91. The frames recorded on the negatives 80 are printed on the color photographic paper 90 in a reduced size. The color photographic paper 90 is wound around a feed roller 93 and taken up by a take-up roller 94 after the printing is effected. After the color photographic paper 90 equivalent to one roll thereof is finished printing, the same is developed, and finally cut per each index sheet.

Disposed below the stage 82 shown in FIG. 8 are seven rod-shaped light sources 95 in such a manner as to correspond to the respective negatives 80. Behind each of the rod-shaped light sources 95, a mirror 96 is disposed. Light emitted from these rod-shaped light sources 95 is transmitted through color correction filters 97 and 98 and reaches the stage 82 to illuminate the negative sheath 77 positioned thereabove. During illumination, only the image portion of the negative sheath 77 is printed in its reduced size on the color photographic paper 90 by means of the reducing lens system 92.

Figure 11:
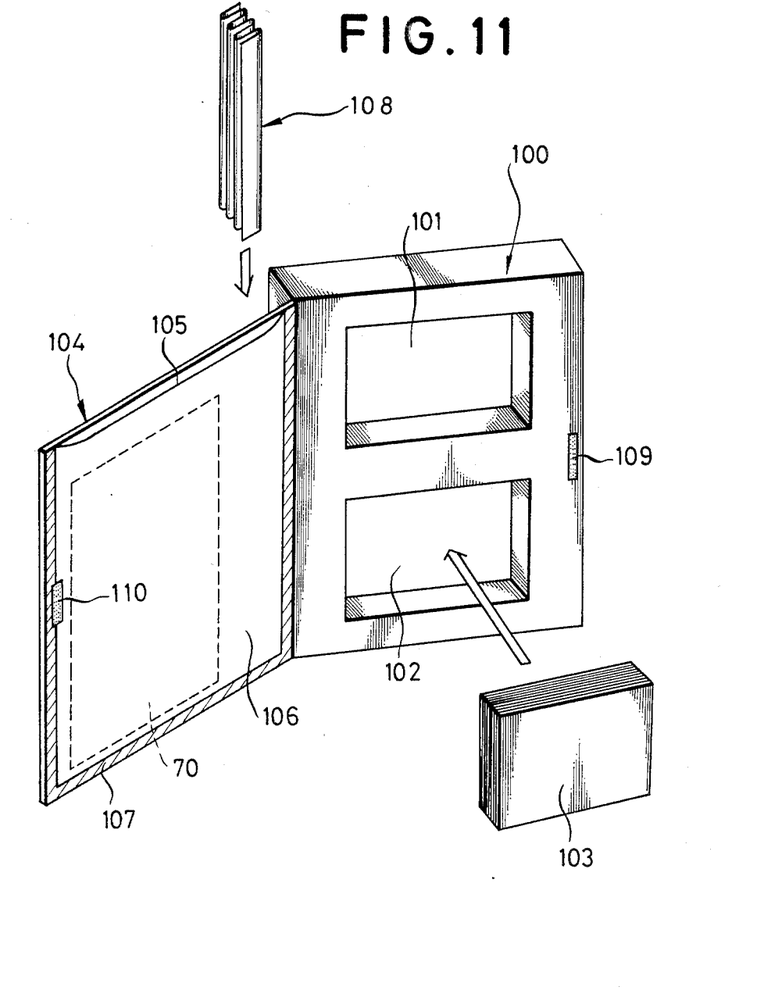
FIG. 11 is an exploded perspective view showing a container for an index sheet together with printed photographs and negative films.

FIG. 11 illustrates a container for an index sheet together with a photographic film and printed photographs. A book-shaped casing 100 includes two recesses 101 and 102, in which a number of printed photographs 103 are stored in a stack. The casing 100 is provided with a swingable cover 104. The cover 104 is formed on its internal surface with a transparent pocket 105, in which the index sheet 70 is inserted. The transparent pocket 105 is formed by attaching, for example, three sides of a transparent sheet 106 to the cover 104. The attaching portion 107 is shown by hatching. A negative sheath 108 inserted with a negative is also inserted in the pocket 105. Reference numerals 109 and 110 denote pressure-sensitive fasteners.

In this way, if the index sheet 70 is utilized for keeping track of the printed photographs, the photographs 103 kept therein can be clearly recognized at a glance merely by observing the index sheet 70 from the outside of the pocket 105 upon opening its cover 104. Furthermore, since the frame numbers are printed, when additional printing is required, it is no longer necessary to refer to the negative film, which is hard to recognize with respect to the printed photographs for checking the frame numbers. Furthermore, the same can be utilized when the printed photographs 103 are put in the recesses 101 and 102 in regular order.

Figure 12:
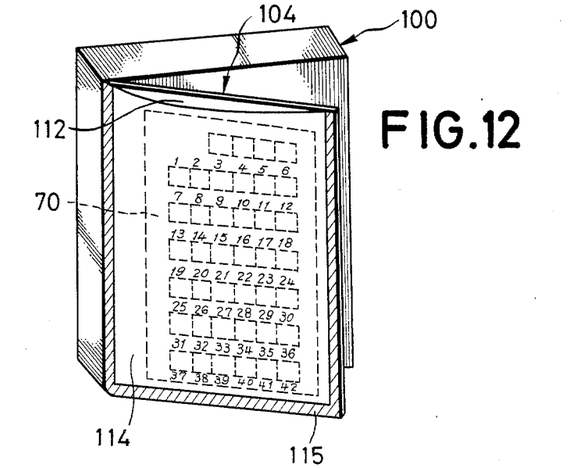
FIG. 12 is a modified embodiment of the container shown in FIG. 11 with its cover slightly shut.
Figure 13:
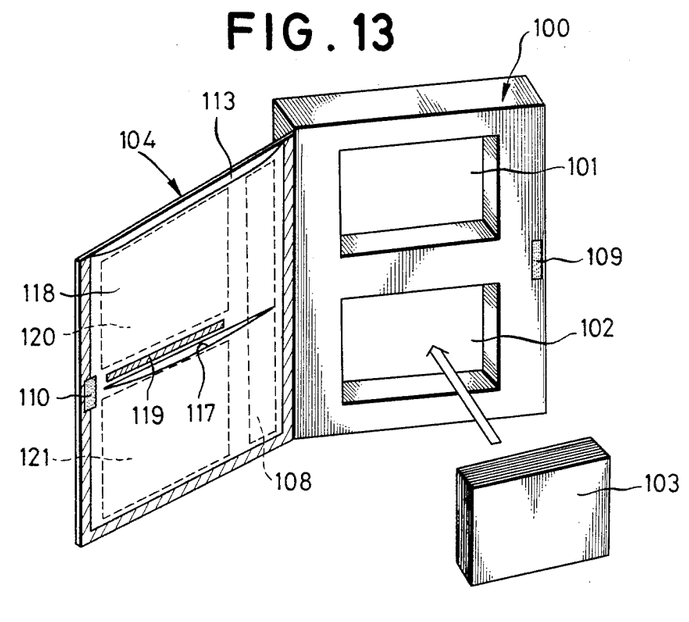
FIG. 13 is an exploded perspective view of the container shown in FIG. 11 in its opened state.

FIGS. 12 and 13 illustrate a container with a transparent pocket for holding an index sheet provided on the front side of its cover, wherein like members of FIG. 11 are denoted by like reference numerals. An openable cover 104 is formed on both its surfaces with bag-shaped, transparent pockets 112 and 113. The pocket 112 on the front side is formed by attaching, for example, three sides of a transparent sheet 114 to the cover 104 to form a bag shape with its top open. The attaching portion 115 is shown by hatching. The pocket 112 has inserted therein an index sheet 70. This pocket 112 can also be used for inserting an illustration or a photograph to be used for a cover sheet, if the user desires it.

The pocket portion 113 on the inside of cover 104 is formed by a transparent sheet 118 provided at its generally central portion with a cut 117 extending in the lateral direction, by attaching three sides thereof and at the same time partially attaching the portion 119 of sheet 118 just above the cut 117. Due to this attached portion 119, the pocket portion 113 is divided into three sections. Two laterally elongated sections can contain two photographs or stacks of photographs 120 and 121, respectively, and the remaining undivided vertically elongated section has inserted therein a negative sheath 108. This container can be put on a shelf, etc. the same as a book. Alternatively, it is possible to provide a large container of suitable dimensions, as a bookcase, and to keep a plurality of containers of the present invention therein in an upright orientation.

What is claimed is:

1. In combination with an image recording medium, an index sheet comprising at least one recording sheet, and a plurality of positive images printed in at least one row on said recording sheet, said positive images being at least a part of a plurality of scenes recorded on said image recording medium, said positive images being arranged in the same order in which the corresponding scenes on said image recording medium are recorded.

2. An index sheet according to claim 1, wherein said respective positive images are arranged in a plurality of parallel rows.

3. An index sheet according to claim 1, there being frame numbers juxtaposed with respective said positive images.

4. An index sheet according to claim 1, wherein said recording sheet is a photographic paper.

5. An index sheet according to claim 1, wherein said image recording medium is a photographic medium.

6. An index sheet according to claim 1, wherein said image recording medium is a still video floppy.

7. An index sheet according to claim 1, wherein said image recording medium is a video cassette.

8. An index sheet according to claim 1, wherein said image recording medium is a video disc.

9. A method for making an index sheet of scenes recorded on an image recording medium, comprising the steps of:

reading out optical or magnetic signals of said scenes on a said medium;

arranging in a group a plurality of said scenes reproduced from said signals; and printing said group of scenes on a recording sheet with said scenes appearing on said recording sheet in the same order in which the corresponding scenes on said image recording medium are recorded.

10. A method for making an index sheet of scenes recorded on a roll of photographic negative film, comprising the steps of:

dividing an exposed said roll of photographic negative film into a plurality of pieces each bearing at least one negative image;

inserting a plurality of said pieces into a negative sheath;

overlapping a shading mask formed with elongated openings in a portion corresponding to said respective negative pieces and provided with an indicating portion for producing frame numbers juxtaposed with said openings; and copying respective scenes of said photographic negative film as a group of positive images on a photographic paper in a reduced size, with said negative pieces inserted in said negative sheath.

11. A method according to claim 10, wherein said frame number indicating portion is a hole defined in said shading mask in the shape of a said frame member.

12. A method according to claim 10, wherein said opening formed in said shading mask is partly shaded by a shading plate which is slidable lengthwise of said elongated opening.

13. A method according to claim 12, wherein said pieces of photographic negative film are illuminated by rod-shaped light source disposed parallel to the respective openings of said shading mask.

* * * * *